Figure 1:
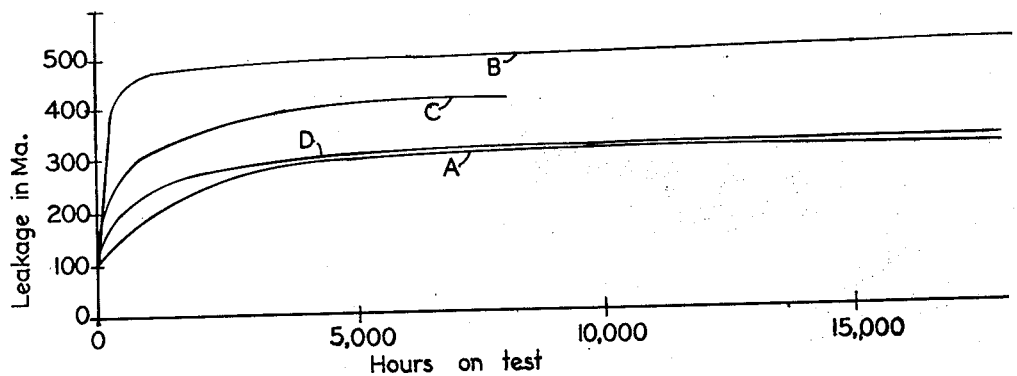

May 28, 1957      W. IRBY      2,793,968

METHOD OF MAKING COPPER OXIDE RECTIFIER CELLS

Filed May 28, 1954

Inventor:
William Irby
by, Richard E. Hosley
His Attorney

United States Patent Office 2,793,968
Patented May 28, 1957

2,793,968

METHOD OF MAKING COPPER OXIDE RECTIFIER CELLS

William Irby, Saugus, Mass., assignor to General Electric Company, a corporation of New York Application May 28, 1954, Serial No. 433,224

6 Claims. (Cl. 148—6.3)

My invention relates to dry plate rectifiers, and more particularly to copper oxide rectifier cells and to methods of making such rectifier cells.

A copper oxide rectifier cell or element consists essentially of a base plate of copper coated on at least one side with a layer of cuprous oxide which is provided with a contact layer, such as nickel plating or the like, forming a current collector or counterelectrode on the surface of the oxide. It is well known that such a cell possesses a barrier plane or blocking layer at the junction between the copper base plate and the cuprous oxide layer, which barrier plane evidences itself in the characteristic whereby the cell conducts electric current much more readily across the barrier plane in one direction than in the other direction. This means, of course, that the electric resistance of the cell in one direction, known as the forward direction, is very appreciably less than its electric resistance in the other direction, known as the reverse direction. Because of this difference between the forward and reverse resistances of the cell across the barrier plane, the cell exhibits a rectifying action when an alternating potential is applied across the cell. In such a cell forward current is that passing into the copper base from the oxide layer thereon.

The electric characteristics of any particular copper oxide rectifying cell are not fixed, but change gradually over the useful life of the cell. This is particularly true during the first few days of the cell's use. Thereafter the electric characteristics of an acceptable cell tend to become relatively fixed or stabilized. The graphical representations of such electric characteristics over a period of time are known as the aging characteristics of a cell. The aging characteristics which are commonly utilized to determine the quality of a cell are its reverse or leakage current characteristic at constant voltage and its forward voltage drop characteristic at constant current. These aging characteristics are representative, respectively, of the manner in which the reverse and forward electric resistances of a cell vary with use.

It is evident of course that, in general, it is always desirable to provide a cell whose leakage current at constant voltage is low, i. e. reverse resistance is high, and whose forward resistance is relatively low. It is further desirable that the normal rise in forward resistance and decrease in reverse resistance which is experienced upon first placing a new cell in service shall be relatively temporary and shall not exceed predetermined limits, so that the cell does not destroy itself by overheating. The normal voltage rating of any cell, that is the maximum voltage which may normally be applied to the cell in a reverse direction in operation, is usually determined not by any initial tendency of the cell to break down as a dielectric, but by the fact that beyond a predetermined voltage any particular cell demonstrates such an unfavorable aging characteristic in the reverse direction that it will destroy itself as a rectifier or break down dielectrically due to overheating.

It is supposed that current rectification in a copper oxide cell results from a crystalline and chemical situation wherein the electron flow in one direction is limited by an energy barrier between the copper base plate and the cuprous oxide layer thereon. The energy barrier results from a difference in effectiveness of the materials on opposite sides of the barrier in acting as electron donors and electron acceptors. The effectiveness of the barrier depends upon the chemical constitution of the cell as well as upon its physical treatment during the process of manufacture.

In the manufacture of what I shall hereinafter refer to as standard copper oxide rectifier cells, copper plates of commercial purity are first thoroughly cleaned and preferably etched by dipping in nitric acid and then "fired" by exposure to an oxidizing atmosphere in a furnace at about 1800° F. to 1900° F. for a period of about 14 minutes. Thereafter the plates are cooled for about 2½ minutes in a cooling zone of the furnace which is maintained at about 870° to about 930° F. The plates are then annealed for about 9 minutes at a temperature of about 900° to 1100° F. After annealing such plates have heretofore been quenched immediately in cold water, and thereafter dried and prepared for the application of a metal contact layer over the cuprous oxide layer formed upon the copper during the firing operation. In applying such a contact layer the thin outer layer of cupric or black oxide which appears upon the outer surface of the cuprous or red oxide is first removed, preferably by electrolytic reduction. Thereafter, a layer of metal, such as nickel, is applied to the outer surface of the cuprous oxide, as by electrolytic deposition.

In my application Serial No. 212,385 filed February 23, 1951, now Patent 2,739,276 issued March 20, 1956, I have disclosed and claimed copper oxide rectifier cells and a method of manufacturing the same whereby their operating voltage may be increased at least three times that previously used. The procedure disclosed in that application is characterized by three significant steps, in addition to those employed in accordance with the above disclosed procedure for making a standard cell which is adapted for operation at 6 volts. These three significant steps consist in coating the copper base plate with a thin film of antimony, dipping the coated plate in a dilute solution of antimony chloride before the firing step, and delaying the cold water quench for an appreciable time after the annealing step. I have also pointed out in that application that the salt predip and delayed quench without the antimony coating step will also produce an improved high voltage cell.

My present application is a continuation in part of my above identified application with regard to a process for making high voltage cells characterized by the additional significant steps over the standard process of employing a delayed quench to increase the forward and reverse resistance of a cell in combination with a salt dip employed for restoring an acceptable forward resistance without adversely affecting the reverse resistance of such a cell. It also contains disclosure with regard to certain improvements resulting from coating the copper base plate with a plurality of metal films in place of the single coating film of antimony disclosed in my earlier application.

Accordingly, therefore, my present invention is closely related to my previous invention, and one object thereof is to increase the normal operating voltage of copper oxide rectifier cells, whereby for a given voltage the number of rectifier cells or elements in a rectifier stack or assembly may be signficantly reduced.

Furthermore, in accordance with one aspect of my present invention, there is the further object of improving the operating characteristics of a 6 volt cell by decreasing its reverse current, or leakage aging characteristic, while concurrently decreasing its forward voltage characteristic at constant current.

Further objects and advantages of my present invention will become apparent to those skilled in the art from the following description thereof.

A copper oxide rectifier cell having desired operating characteristics at voltages of the order of 6 to 12 volts may be obtained in accordance with my invention by dipping the copper base plate in a dilute solution of antimony chloride or manganese chloride before the plate is fired to produce the copper oxide coating thereon. The copper plate is then cooled and annealed in the usual way and the plate is then exposed to air at room temperature for a predetermined time delay of from 5 to 120 seconds before it is quenched in water, which is also at room temperature. Room temperatures may vary somewhat but are usually at about 20° C. The oxidized plate is then prepared for use in the usual manner by removing the cupric oxide and thereafter applying a contact layer of metal such as nickel to form the counterelectrode. Finally a peripheral area of the cell is stripped of nickel to expose the red cuprous oxide as by treatment in an acid solution or the like and the resulting rectifier cell is then subjected to the usual testing operations.

A copper oxide cell having desired operating characteristics at 18 volts may also be obtained by coating the copper base plate, prior to the salt dip step, with thin superimposed films of manganese and antimony. Such films are preferably formed by a "flash" electroplating operation, and the coatings may be applied in any order although I prefer first to apply to the copper base plate a film of manganese and thereafter to apply over the manganese coating a film of antimony.

Figure 2:
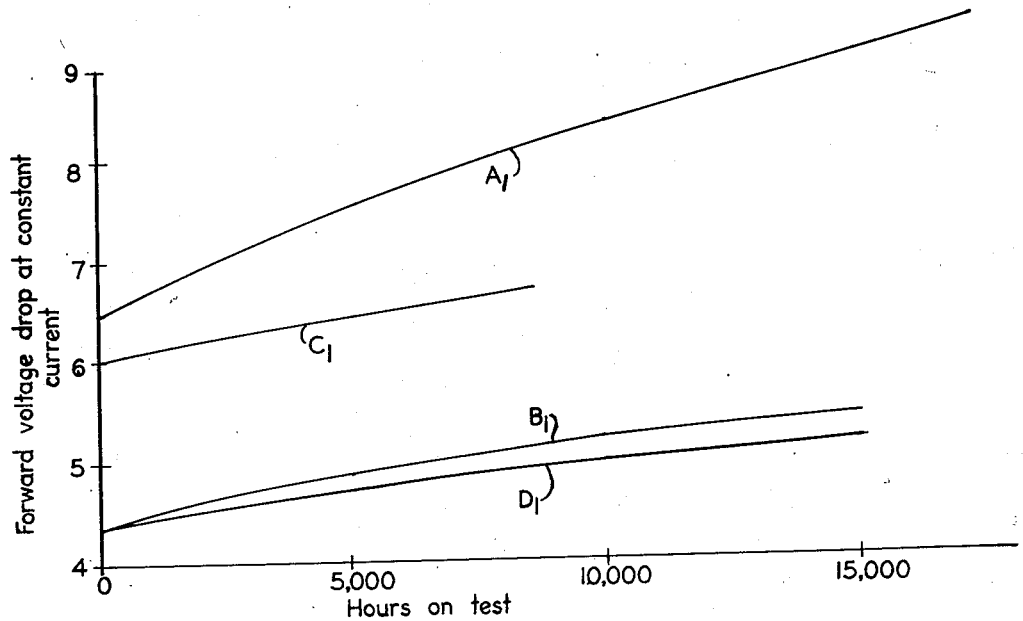

My invention will be more fully understood and the advantages thereof appreciated by referring now to the following detailed description taken in conjunction with the accompanying drawing in which Fig. 1 is a graphical representation of the reverse or leakage current characteristics at constant voltage of rectifier elements embodying my invention shown in comparison with a like characteristic for a 6 volt cell made in accordance with the above referred to standard procedure, and Fig. 2 is a similar graphical representation of the forward voltage drop characteristics at constant current of such rectifier cells.

An 18 volt copper oxide rectifier cell may be fabricated as follows in accordance with one aspect of my invention. A copper base plate of commercial purity, for example Chile copper having a substantially constant content of impurities, is first thoroughly cleaned and then etched by dipping in nitric acid. The clean copper plate is then coated with a very thin film of manganese having a thickness of the order of .000003 to .000005 of an inch. This coating is preferably formed by flash electroplating at 200 ampere seconds per square foot of surface area. The electrolytic bath may have the following composition relative to its water content: manganese sulfate, 13 ounces to the gallon, ammonium sulfate, 10 ounces to the gallon, ammonium sulphocyanate, 8 ounces to the gallon. The plate is then rinsed and coated with a thin film of antimony having a thickness of the order of .000003 to .000005 of an inch. This antimony film is also preferably formed by a flash electroplating at about 200 ampere seconds per square foot of surface area of the plate. The electrolytic bath may have the following composition relative to its water content: antimony fluoride, 33 ounces to the gallon and ammonium fluoride, 27 ounces to the gallon. In each case the electrolytic baths are maintained at room temperature.

After the plating operations above described, the copper base plate is again rinsed and then dipped in a dilute salt solution (i. e. less than 1% concentration) of manganese chloride. One such solution which I have employed consists by weight of 1% manganese chloride, .1% ferric nitrate, .05% sodium tetraborate, about 3% tartaric acid, and the remainder water. It is also possible to use an antimony chloride salt dip of the composition disclosed in my above-identified application. This dip has the following composition by weight: .5% antimony chloride, .05% sodium tetraborate, .1% ferric nitrate, about 3% tartaric acid, and the remainder water. The tartaric acid in these solutions serves principally to increase the amount of chloride held in the solution and the sodium tetraborate serves principally as a cleaning flux.

After the salt dip operation the plate is fired in the usual manner by exposure to an oxidizing atmosphere at a temperature of about 1800° to 1900° F., preferably 1860° F. for a period of about 14 minutes, cooled for about 2½ minutes in a cooling zone maintained at about 870° to 930° F. and then annealed for about 9 minutes at a temperature of about 900° to 1100° F. preferably at 1050° F.

After annealing the oxidized plate is air cooled to about 500° to 600° F. as by exposure to cold air (i. e. air at or about room temperature) for a delay interval of about ½ to 2 minutes and then quenched in cold water (i. e. water at or about room temperature).

When the cells are removed from the cold water quench they are dried and prepared for the application of a metal contact layer, or counterelectrode, over the cuprous oxide layer formed during the firing operation. The cells as they come out of the quench bath usually have formed over the cuprous oxide a thin layer of cupric or black oxide as a result of their exposure to air. This cupric oxide is first removed, preferably by electrolytic reduction to metallic copper. Thereafter, a contact layer of metal, such as nickel, is applied to the outer surface of the cuprous oxide, as by electrolytic deposition. Finally a peripheral area of the cell is stripped of nickel to expose the red oxide, as by treatment in an acid solution or the like, and the resulting rectifier cells are then subjected to suitable testing operations.

The effect of this process of manufacturing copper oxide rectifier cells may best be appreciated by referring to the characteristic curves shown in Figs. 1 and 2 of the drawing. The reverse and forward aging characteristics of such a cell are shown respectively at A in Fig. 1 and at $A_1$ in Fig. 2 when operating at 18 volts. For comparison purposes, the corresponding characteristics of a 6 volt copper oxide cell made by the standard procedure above recited are shown respectively at B in Fig. 1 and at $B_1$ in Fig. 2. It will be noted that the 18 volt cell made in accordance with my procedure has a leakage or reverse aging characteristic which becomes stable in substantially the same manner as the standard 6 volt cell and that its leakage is considerably less at 18 volts than for a standard cell at 6 volts. Furthermore as shown in Fig. 2, the forward voltage drop of such an 18 volt cell stabilizes upon aging in like manner to a 6 volt standard cell.

As pointed out in my earlier filed application above referred to, it is possible to obtain a high voltage copper oxide cell even though the metal coating step thereof and above described herein is omitted. The reverse leakage current characteristic of such a cell at 12 volts is shown by curve C in Fig. 1 and the forward voltage drop at constant current characteristic of such a cell is shown in Fig. 2 by curve $C_1$. The characteristic curves C and $C_1$ shown in Figs. 1 and 2 are for 12 volt copper oxide cells having an antimony salt dip and a delayed quench of 50 seconds.

It is, of course, not necessary to operate such cells at 12 volts. They may be operated at 6 volts with the attainment of desired operating characteristics over a standard 6 volt cell. I have shown at D and $D_1$ in Figs. 1 and 2 of the drawing, the characteristics of a 6 volt improved copper oxide cell made in accordance with the above disclosed procedure using an antimony chloride dip and a delayed quench of about 15 seconds. By comparing the characteristic curves D and $D_1$ of this improved 6 volt cell, with the characteristic curves B and B₁ for a 6 volt standard cell, the improvement resulting from my procedure becomes apparent.

The metal coatings employed in accordance with my invention increase both the forward and reverse resistance characteristics of the copper oxide cell. The delayed quench also increases both the forward and the reverse resistance characteristics of the copper oxide cell and the salt dip is employed to restore an acceptable forward resistance without adversely affecting the reverse resistance of such a cell. However, in order to secure a cell which will operate satisfactorily at 18 volts, it is necessary to employ the metal coating step.

When the metal coating step is employed, the thin surface films of manganese and antimony become alloyed with the copper base plate before the copper itself is oxidized to form cuprous oxide. These coating metals are present as traces in both the copper and the cuprous oxide on opposite sides of the barrier plane of the rectifier cell. The manganese and antimony may, however, be added to the copper base plate in any other suitable manner prior to firing. Thus manganese and antimony bearing copper may be fired directly without employing the metal coating step. Furthermore it is obvious that the manganese and antimony films need not be electrolytically deposited on the copper base plate as above described since other suitable methods may be utilized for providing the base plate with films or coatings of manganese and antimony prior to firing.

The effectiveness of the chloride salt dip in decreasing the forward resistance more than it decreases the reverse resistance may be explained from the action of the chloride acid radical in the dip. In the firing process the chloride radical will react with copper in the base layer of a cell to form cupric and cuprous chloride. Any cupric chloride present will undergo a reduction to form cuprous chloride and free chlorine, and the free chlorine will react to form more cuprous chloride. The presence of the chlorine radical in the copper oxide layer has the effect of reducing the forward resistance since chlorine is known to be a good electron acceptor.

I have also determined that cells having desired operating characteristics at 18 volts may also be produced by using a double plating of iron and antimony instead of the manganese and antimony platings above referred to. With such an iron-antimony plating procedure the salt dip and delayed quench steps are also employed as when using the manganese-antimony plating.

While I have described only certain preferred embodiments in my invention by way of illustration, many modifications will occur to those skilled in the art, and I wish to have it understood that I intend in the appended claims to cover all such modifications as fall within the true spirit and scope of my invention.

What I claim as new and desire to secure by Letters Patent of the United States is:

1. The method of producing a copper oxide rectifier cell which comprises dipping a base plate of copper in a dilute solution of a chloride of a metal selected from the group consisting of manganese and antimony, heating said plate to form a layer of cuprous oxide on at least one surface thereof, exposing the oxidized plate to cold air for an appreciable delay interval after heating, and then quenching the oxidized plate in cold water.

2. The method of producing a copper oxide rectifier cell which includes dipping a base plate of copper in a dilute water solution containing less than 1% by weight or a chloride of a metal selected from the group consisting of manganese and antimony, heating said plate to form a layer of cuprous oxide on at least one surface thereof, exposing the oxidized plate to cold air for from 5 to 120 seconds after heating, and then quenching the oxidized plate in cold water.

3. The method of producing a copper oxide rectifier cell which includes dipping a base plate of copper in a water solution containing .5% antimony chloride and .1% ferric nitrate, heating said plate in an oxidizing atmosphere at about 1800° F. to 1900° F. for a period of about 14 minutes to form on the copper base plate a layer of cuprous oxide, cooling said plate for about 2½ minutes in a cooling zone maintained at about 870° F. to 930° F., annealing said oxidized plate for about 9 minutes at a temperature of about 900° F. to 1100° F., exposing said plate to cold air for a delay interval of from 5 to 120 seconds, and then quenching said plate in cold water.

4. The method of producing a copper oxide rectifier cell which comprises alloying manganese and antimony with at least one surface of a base plate of copper, dipping said plate in a dilute solution of a chloride of a metal selected from the group consisting of manganese and antimony, heating said plate to form a layer of cuprous oxide on at least one surface thereof, exposing the oxidized plate to cold air for an appreciable delay interval after heating, and then quenching the oxidized plate in cold water.

5. The method of producing a copper oxide rectifier cell which includes coating at least one surface of a copper base plate with thin superimposed films of manganese and antimony, dipping said plate in a dilute solution of a chloride of a metal selected from the group consisting of manganese and antimony, heating said plate to form a layer of cuprous oxide on at least one surface thereof, exposing the oxidized plate to cold air for an appreciable delay interval after heating, and then quenching the oxidized plate in cold water.

6. The method of producing a copper oxide rectifier cell which includes coating at least one surface of a copper base plate with thin superimposed films of manganese and antimony, dipping the coated plate in a dilute water solution containing less than 1% by weight of a chloride of a metal selected from the group consisting of manganese and antimony, heating said plate in an oxidizing atmosphere at 1800° F. to 1900° F. for a period of about 14 minutes to alloy said films of manganese and antimony with said copper base plate and to form thereon a layer of cuprous oxide, cooling said plate for about 2½ minutes in a cooling zone maintained at about 870° F. to 930° F., annealing said oxidized plate for about 9 minutes at a temperature of about 900° F. to 1100° F., exposing said plate to cold air for a delay interval for about ½ to 2 minutes, and then quenching said plate in cold water.

References Cited in the file of this patent

UNITED STATES PATENTS

| | | |
|---|---|---|
| 1,834,275 | Geiger | Dec. 1, 1931 |
| 1,936,792 | Kahler | Nov. 28, 1933 |
| 2,060,905 | Smith | Nov. 17, 1936 |
| 2,064,301 | Freeman | Dec. 15, 1936 |
| 2,186,781 | Dowling | Jan. 9, 1940 |
| 2,484,252 | Smith | Oct. 11, 1949 |
| 2,559,370 | Reidel | July 3, 1951 |
| 2,701,285 | Irby | Feb. 1, 1955 |

FOREIGN PATENTS

| | | |
|---|---|---|
| 499,451 | Germany | June 6, 1930 |